United States Patent
Chai et al.

(10) Patent No.: US 9,658,344 B1
(45) Date of Patent: May 23, 2017

(54) APPARATUS INCLUDING SCINTILLATION CRYSTAL ARRAY WITH DIFFERENT REFLECTOR LAYERS AND ASSOCIATED METHODS

(71) Applicant: CRYSTAL PHOTONICS, INCORPORATED, Sanford, FL (US)

(72) Inventors: Bruce Chai, Oviedo, FL (US); Xiao-mei Pan, Nan-jing (CN); Bao-hui Zhou, Nan-jing (CN)

(73) Assignee: CRYSTAL PHOTONICS, INCORPORATED, Sanford, FL (US)

( * ) Notice: Subject to any disclaimer, the term of this patent is extended or adjusted under 35 U.S.C. 154(b) by 0 days.

(21) Appl. No.: 14/932,493

(22) Filed: Nov. 4, 2015

(51) Int. Cl.
G01T 1/164 (2006.01)
G01T 1/202 (2006.01)
G01T 1/20 (2006.01)

(52) U.S. Cl.
CPC .......... G01T 1/2023 (2013.01); G01T 1/1641 (2013.01); G01T 1/2002 (2013.01); G01T 1/2018 (2013.01)

(58) Field of Classification Search
CPC .............................. G01T 1/202; G01T 1/2002
See application file for complete search history.

(56) References Cited

U.S. PATENT DOCUMENTS

| | | | |
|---|---|---|---|
| 3,786,253 A * | 1/1974 | Haffner | G01T 3/06 250/360.1 |
| 4,563,584 A * | 1/1986 | Hoffman | G01T 1/2002 250/361 R |
| 4,929,835 A * | 5/1990 | Yamashita | G01T 1/1644 250/367 |
| 5,091,650 A | 2/1992 | Uchida et al. | |
| 5,610,401 A | 3/1997 | Kuwabara et al. | |
| 6,992,295 B2 | 1/2006 | Romanov et al. | |
| 7,115,875 B1 | 10/2006 | Worstell | |
| 7,671,339 B2 | 3/2010 | Shibuya et al. | |
| 8,426,823 B2 | 4/2013 | Schulz et al. | |
| 8,481,952 B2 | 7/2013 | Menge et al. | |
| 9,012,854 B2 | 4/2015 | Wieczorek et al. | |
| 9,052,399 B2 | 6/2015 | Perna | |
| 9,110,174 B2 | 8/2015 | Wieczorek et al. | |
| 2004/0232342 A1* | 11/2004 | Aykac | G01T 1/202 250/367 |
| 2007/0098138 A1* | 5/2007 | Bessho | A61B 6/032 378/19 |
| 2009/0018451 A1* | 1/2009 | Bai | A61B 5/0073 600/476 |
| 2013/0075617 A1* | 3/2013 | Simonetti | G21K 4/00 250/361 R |

(Continued)

Primary Examiner — Kiho Kim
(74) Attorney, Agent, or Firm — Allen, Dyer, Doppelt & Gilchrist, P.A.

(57) ABSTRACT

A radiation detector, such as for a PET scanner, may include an array of scintillator crystals, with each scintillator crystal having a polished end, a roughened end opposite the polished end, and polished sides extending between the polished end and the roughened end. The detector may also include a specular reflector layer between adjacent polished sides of adjacent ones of the array of scintillator crystals, and a diffusive reflector layer adjacent the roughened ends of the array of scintillator crystals. The detector may further include at least one photodetector adjacent the polished ends of the array of scintillator crystals.

28 Claims, 13 Drawing Sheets

(56) References Cited

U.S. PATENT DOCUMENTS

| | | | |
|---|---|---|---|
| 2013/0170805 A1* | 7/2013 | McBroom | G01T 1/1644 385/129 |
| 2013/0273810 A1* | 10/2013 | Hsu | B24B 9/065 451/5 |
| 2014/0231655 A1 | 8/2014 | Dueppenbecker et al. | |
| 2014/0353510 A1 | 12/2014 | Spanoudaki et al. | |
| 2014/0367577 A1 | 12/2014 | Badawi et al. | |

* cited by examiner

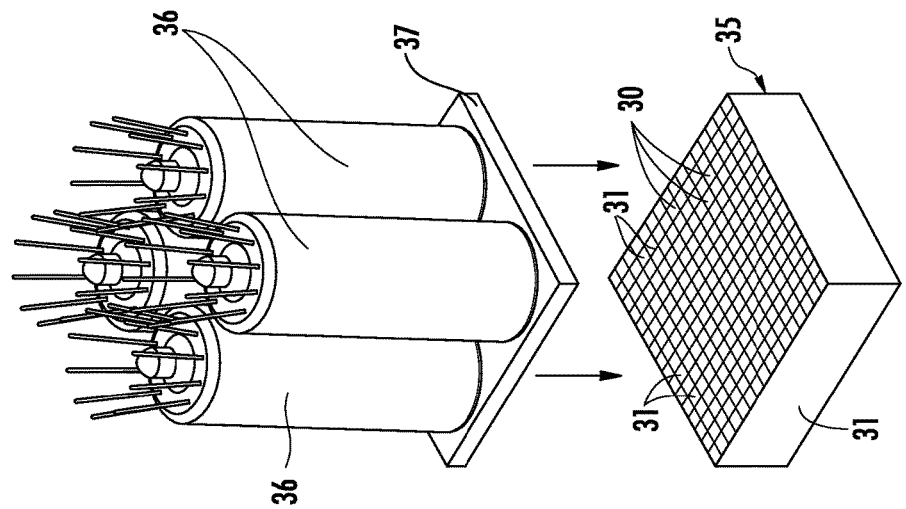
FIG. 2
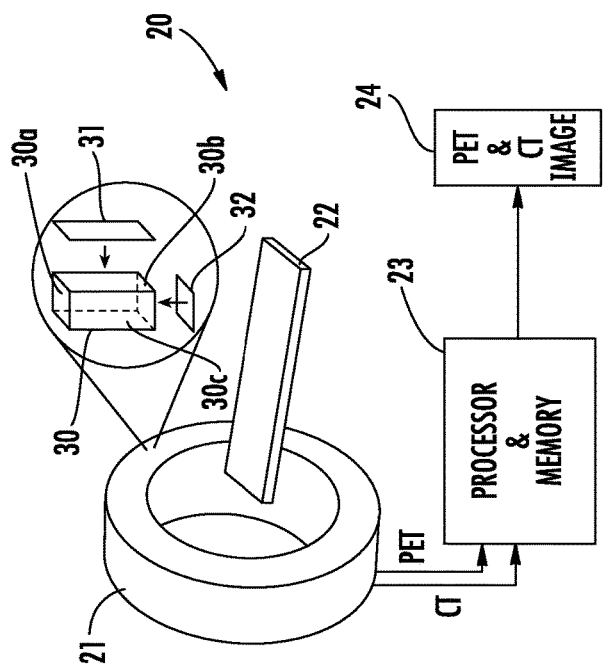
FIG. 1
FIG. 3

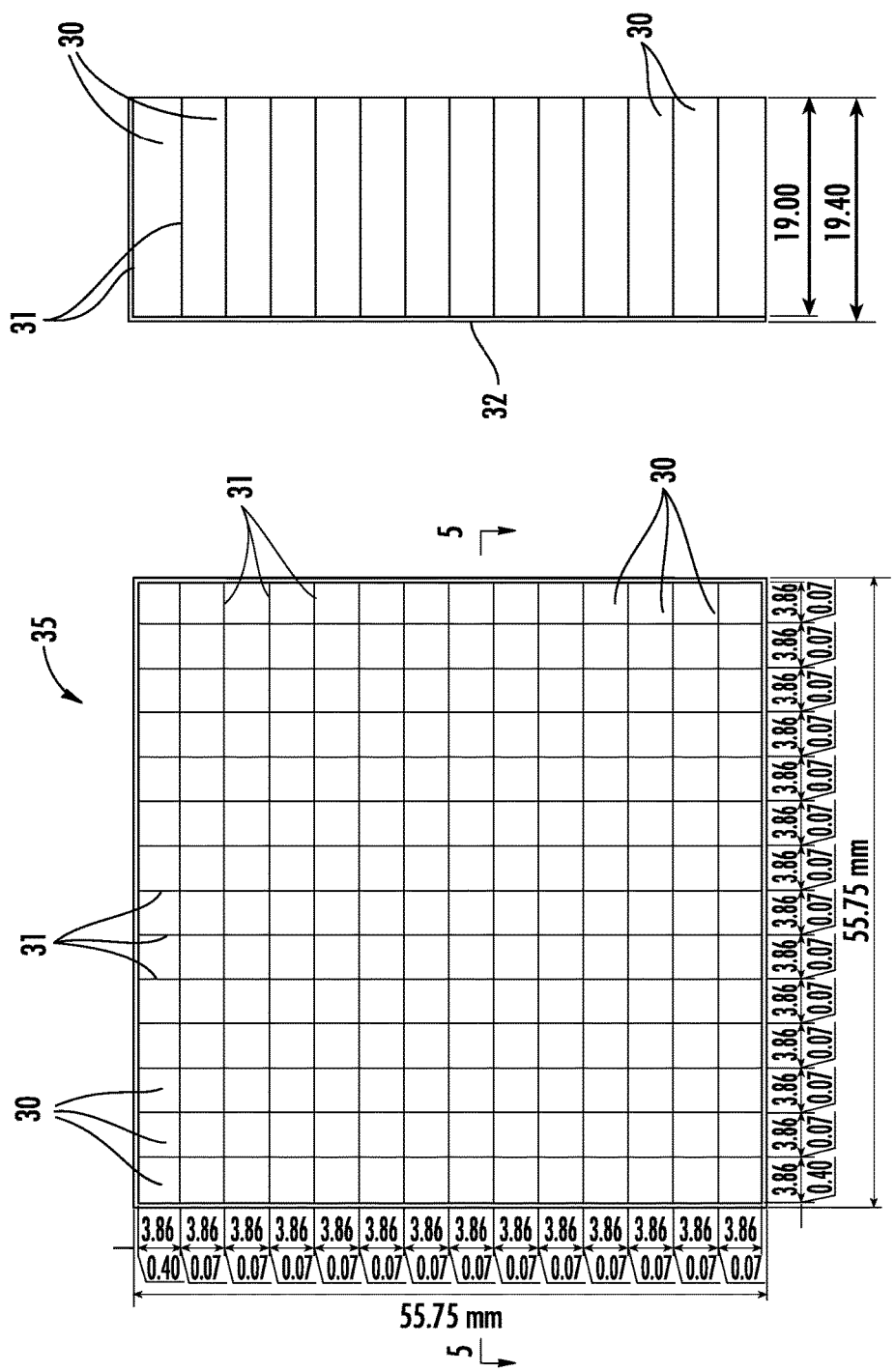

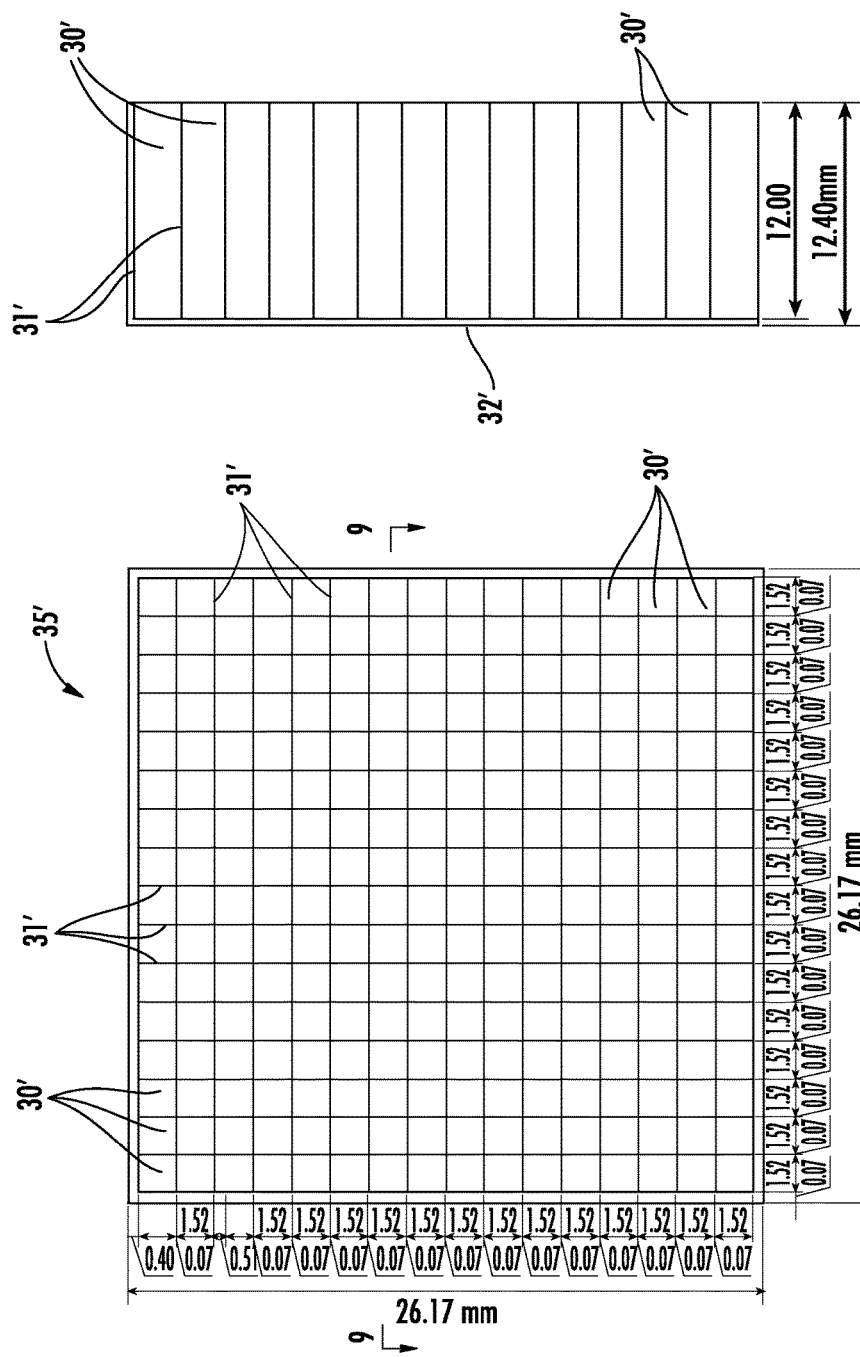

US 9,658,344 B1

APPARATUS INCLUDING SCINTILLATION CRYSTAL ARRAY WITH DIFFERENT REFLECTOR LAYERS AND ASSOCIATED METHODS

FIELD

The present invention relates to the field of radiation detectors, and, more particularly, to such detectors based on scintillation crystals and related methods.

BACKGROUND

Positron Emission Tomography (PET) is one of the three major modern medical diagnostic approaches used as a non-evasive tool to detect tumors or other abnormal conditions of the body. A modern PET scanner may typically use a very large number of scintillating crystals as gamma-ray detectors with a relatively small x-y dimension, and a long z dimension. Typically on the order of 20,000 to 30,000 such scintillation crystals are used in a PET scanner detector ring to capture the two emitted gamma rays from each positron-electron annihilation event to thereby locate the location with high precision. It is possible to trace back the locations of emission and thus reconstruct the tumor image accordingly.

Scintillation is a process to capture the gamma-ray and convert it into visible light that, in turn, can be detected with a photodetector, such as photo-multiplier tube (PMT), photo diode, or more advanced silicon photo-multiplier (SiPM). Of course, to have effective detection, it is desired to have more visible photons generated by each gamma-ray capture event.

Because of the desire in high energy physics to detect various high energy particles, there have been extensive searches in the past century for more efficient scintillator crystals that generate more photons per gamma-ray capture. For PET scanners, it is desired not only to capture the gamma-ray, but also to know the position of capture to make the accurate image reconstruction. To do so, the scintillator crystals are normally cut into thin long rectangular rods packed into two dimensional array blocks. These array blocks are installed in the PET scanner to form a detector ring of different sizes. Depending on the specific application, patient or animals will be scanned through to detect the tumors inside their body.

The construction of the detector array block is important to the performance of the PET scanner. It is desired to select have scintillating crystals with high light yield and good stopping power to have efficient capture of the gamma-ray. Since there are a large number of crystals packed together, it is desired that the crystals are mechanically strong so that they can be cut and polished into such small thin rods. The typical physical size of these crystals varies from 6 mm down to 0.5 mm in cross-dimension and 30 mm down to 5 mm in length depending on the specific application. The size of the array block will also vary depending on the kind of photodetector used, the specific dimension and geometry of the photodetector and finally the specific scheme of detection.

In the traditional way of gamma-ray detection using PMT detectors, the scintillating crystal blocks are each typically built in a 12×12, 13×13, 14×14 or even larger array depending on the PMT arrangement. Each of the individual crystals are optically isolated to each other with high reflection films that covers five sides of the crystal surfaces except one end where the scintillating light will be emitted to reach to the PMTs. For example, a 14×14 array block will contain 196 crystal pixels which share only four PMTs. To have the emitted scintillating light reach to all four PMTs, a special designed light guide may be used between the array block and the PMTs. The principle used to locate the exact position of the emitting crystal is based on the calculation of the distributed light sharing ratio from these four PMTs. Since the PMT is a relatively expensive detector, to control the total cost of a typical PET scanner, it is desirable to use as few PMTs as possible, but at the same time it is also desirable to be able to accurately locate the position of the scintillating light source. At the present time, the 14×14 array has reached just about the detecting limit for the PMTs. Each PMT in this case will share forty-nine crystals. So for a full size scanner ring, a manufacturer may limit the total number of PMTs used to below 600 units to control the cost, but still have high enough image resolution.

To be able to have an accurate calculation of the emitting pixel position, all the four PMTs should be able to detect adequate amount emitting photons at the same time frame. This means that the scintillating crystal should desirably emit as many visible photons as possible with each capture of the incoming gamma ray. This is the very reason that there are extensive research efforts to find the best scintillating crystals. However, there is a limit on how one can find such a crystal with so much light emission. Even with good light emission, it may also be equally important to be able to channel the scintillating light to the end of the crystal so that it can reach the PMTs. Accordingly, there are also efforts to select the best reflecting film so that sufficient light can be reflected out at one end of a crystal.

To be able to capture as much of the emitting gamma rays from a patient's body, it is desired to have the detector ring packed with a maximum volume of the scintillating crystals. This means that one would to reduce the amount of volume for the reflecting material. So the reflecting film should be thin and effective. Over the years there are a number of materials that have been selected as reflectors. Here are listed of some of the well-known reflectors that have been used: liquid white paints made of MgO, $TiO_2$ or $BaSO_4$; solid powders of MgO, or $TiO_2$; reflecting films, such as Teflon tape, Lumirror film or 3M Vikuiti Enhanced Specular Reflector (ESR) film. Such materials should also be compatible for ease of manufacture, especially for mass production. In the traditional PMT detector based array blocks, the choice of reflecting film is relatively forgiving, since the scintillating crystal size is usually not so small.

A number of patents disclose approaches to preparing the scintillator crystals and the various reflective materials used to make an array of such crystals. For example, U.S. Pat. Nos. 5,610,401; 8,481,952; 9,012,854, and 8,426,823 each discloses various crystal and packaging configurations.

There still exists a desire for better scintillation crystal performance, especially for radiation detectors, such as PET scanners.

SUMMARY

An apparatus, such as a PET scanner, may include an array of scintillator crystals, each scintillator crystal having a polished end, a roughened end opposite the polished end, and a plurality of polished sides extending between the polished end and the roughened end. A specular reflector layer may be between adjacent polished sides of adjacent ones of the array of scintillator crystals, and a diffusive reflector layer adjacent the roughened ends of the array of scintillator crystals.

The embodiments use different types of reflecting materials for the array of scintillator crystals to increase light output at one end of the array, reduce the volume fraction of the reflecting materials between adjacent crystals, and/or simplify the assembling procedure for mass production.

For example, the specular reflector layer may comprise a Vikuiti™ Enhanced Specular Reflector (ESR) layer. Also, the diffusive reflective layer may comprises polytetrafluoroethelene (PTFE), or at least one of MgO, $TiO_2$, and $BaSO_4$, for example. Each scintillator crystal may comprise one of LYSO, LSO, BGO, NaI(Tl), $LaBr_3$, GSO, LGSO and GAGG.

The roughened end of each scintillator crystal may be based upon lapping with a 600 mesh grit abrasive, although other approaches are also contemplated.

In some embodiments, scintillation crystal may have respective x and y dimensions in a range of 0.4 to 6.3 mm. And each scintillation crystal may have a z dimension in a range of 5 to 30 mm. Further, each of the roughened end and the polished end may have a square shape.

The apparatus may further comprise at least one photodetector adjacent the polished ends of the array of scintillator crystals. The apparatus may also include a processor and a memory associated therewith coupled to the at least one photodetector for processing signals to generate images, for example, such as for PET scanning. In some embodiments, the apparatus may further comprise at least one other imaging scanner coupled to the processor.

The at least one photodetector may comprise a plurality of photomultiplier tubes. In other embodiments, the at least one photodetector may comprise a plurality of solid state photodetectors.

A method aspect is for making a radiation detector. The method may include forming a plurality of scintillator crystals so that each scintillator crystal has a polished end, a roughened end opposite the polished end, and a plurality of polished sides extending between the polished end and the roughened end. The method may further include arranging the plurality of scintillator crystals into an array with a specular reflector layer between adjacent polished sides of adjacent ones of the array of scintillator crystals, and providing a diffusive reflector layer adjacent the roughened ends of the array of scintillator crystals.

BRIEF DESCRIPTION OF THE DRAWINGS

FIG. 1 is a schematic diagram of a PET/CT scanner in accordance with the present invention.

FIG. 2 is an exploded perspective view of a radiation detector as in the scanner of FIG. 1.

FIG. 3 is a schematic side view of a portion of a radiation detector that may be used in the scanner of FIG. 1.

FIG. 4 is a top plan view of the 14×14 scintillation crystal array of FIG. 2.

FIG. 5 is a cross-sectional view of FIG. 4 taken along line 5-5.

FIG. 8 is a top plan view of the 14×14 scintillation crystal array of FIG. 7.

FIG. 9 is a cross-sectional view of FIG. 8 taken along line 9-9.

DETAILED DESCRIPTION

Figure 6:
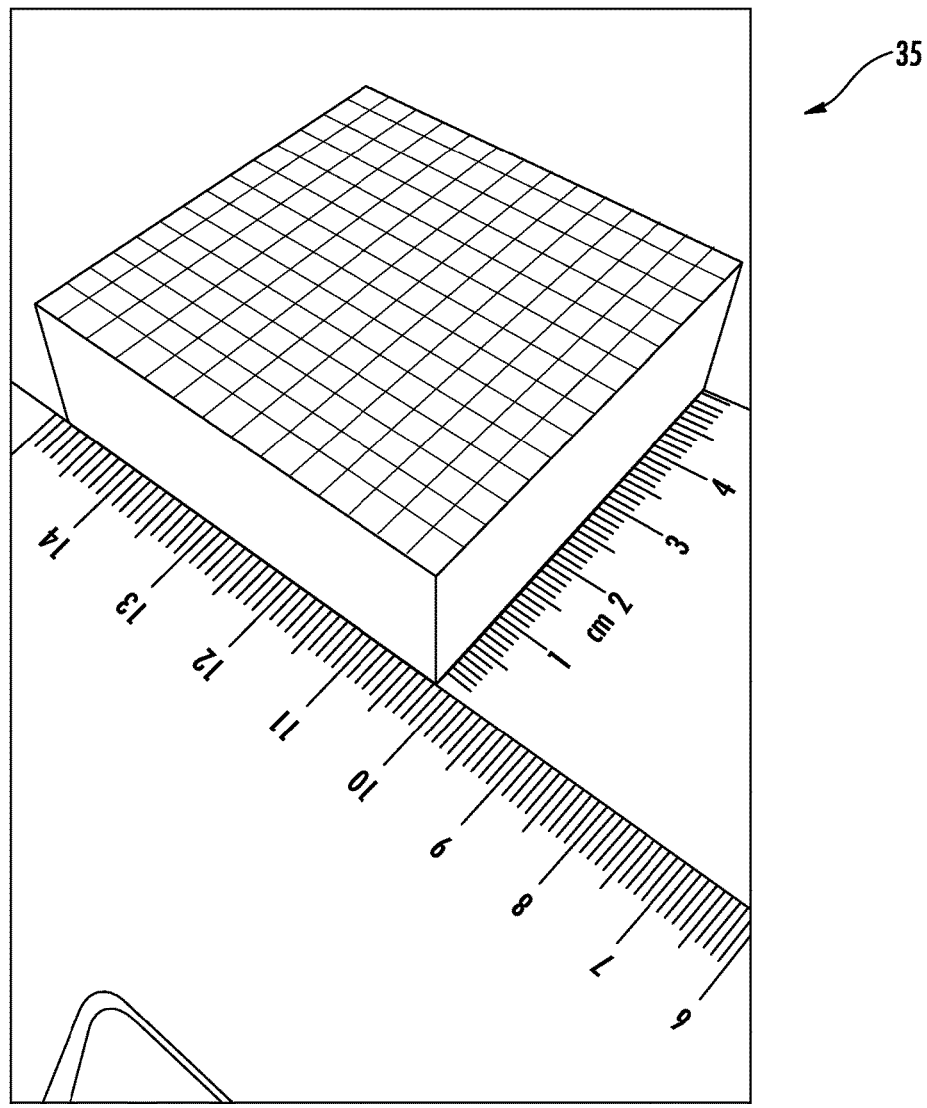
FIG. 6 is a perspective view of the 14×14 array in accordance with FIGS. 4 and 5.
Figure 7:
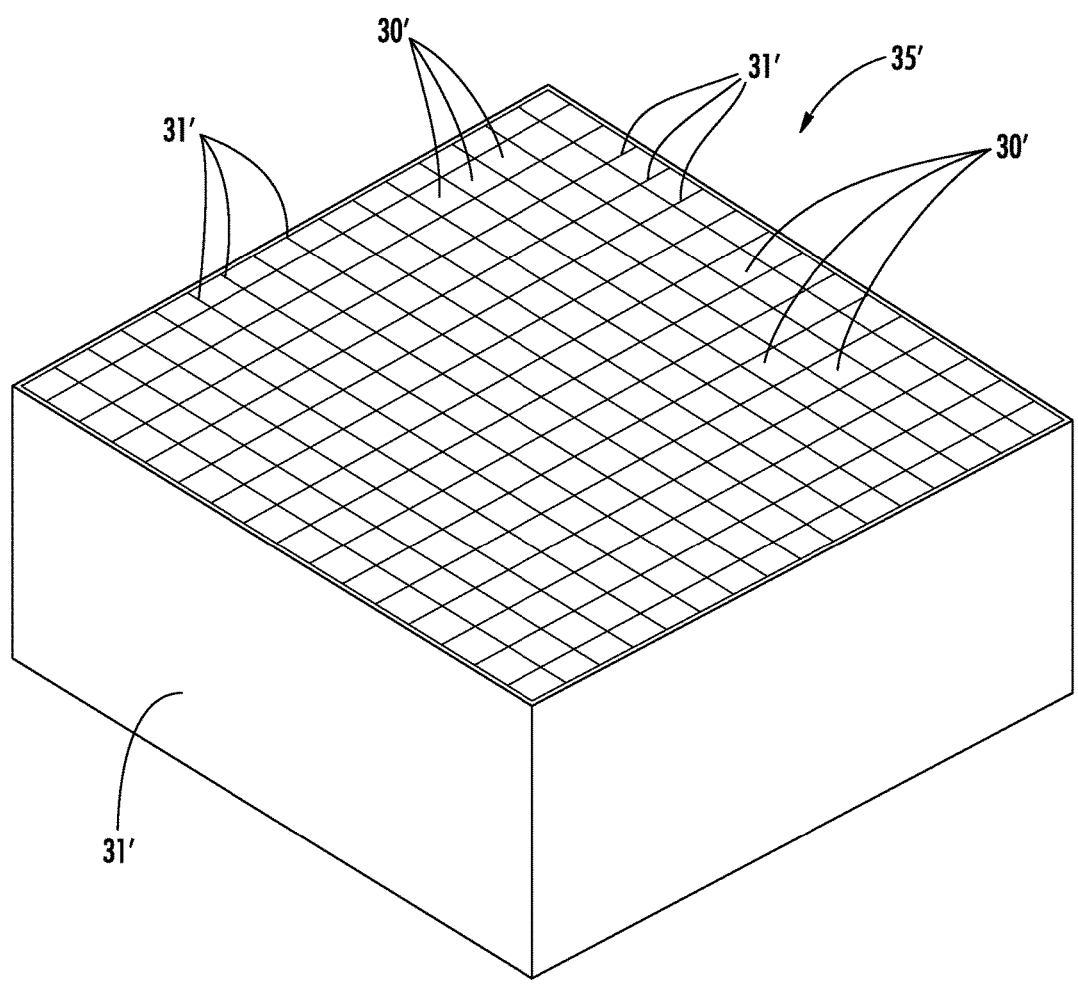
FIG. 7 is a perspective view of another embodiment of a 16×16 array of scintillation crystals according to the invention.
Figure 10:
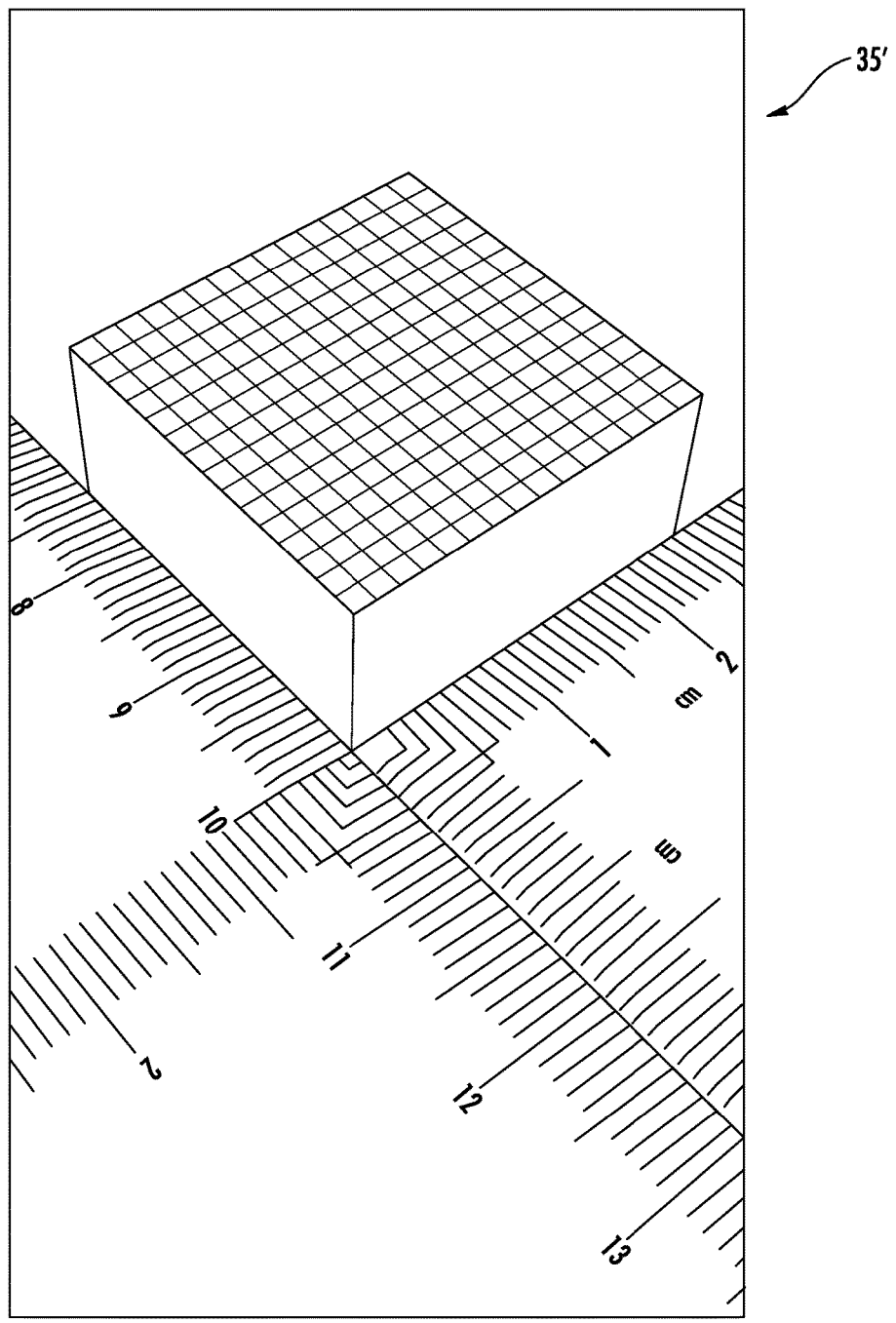
FIG. 10 is a perspective view of the 14×14 array in accordance with FIGS. 7-9.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1 and 2 an apparatus in the form of a combined PET/CT scanner 20 is now described including the scintillation crystals 30 having improved light output as described in greater detail below. The PET/CT scanner 20 includes a cylindrical sensor ring 21 and a patient carrying platform 22 associated therewith. The PET/CT scanner 20 may include conventional CT components from which a CT image may be generated as will be appreciated by those skilled in the art. As will also be appreciated by those skilled in the art, the scintillation crystals 30 may be used in a PET scanner, or a SPECT scanner. In addition, the scintillation crystals 30 may be used with a multimodal PET/MRI scanner in other embodiments.

The PET/CT scanner 20 may also include a processor and associated memory 23 that generate, on a display 24, a combined PET and CT image as will be appreciated by those skilled in the art. The scintillation crystals 30 may be used in a PET scanner for an animal or human body part, which is typically smaller that the full sized PET/CT scanner 20 illustrated in FIG. 1. The scintillation crystals 30 may be used in other radiation detecting applications, such as, for example, for the inspection of goods/containers, as will be appreciated by those skilled in the art.

The PET/CT scanner 20 includes an array of scintillator crystals 30, made from a plurality of array blocks 35, with a single 14×14 array block shown in FIG. 2. Each scintillator crystal 30 has a polished end 30a, a roughened end 30b opposite the polished end, and a plurality of polished sides 30c extending between the polished end and the roughened end. As shown in the exploded enlarged portion of FIG. 1, the specular reflector layer 31 is illustratively positioned between adjacent polished sides of adjacent ones of the array of scintillator crystals 30 (only one of which is shown for clarity), and a diffusive reflector layer 32 is positioned adjacent the roughened ends of the array of scintillator crystals.

The embodiments use different types of reflecting materials for the array of scintillator crystals 30 to increase light output at one end of the array 30a, reduce the volume fraction of the reflecting materials between adjacent crystals, and simplify the assembling procedure for mass production.

For example, the specular reflector layer may comprise a Vikuiti™ Enhanced Specular Reflector (ESR) layer available from 3M Electronic Display Lighting Optical Division of St. Paul, Minn.

Also, the diffusive reflective layer 32 may comprise polytetrafluoroethelene (PTFE). Alternatively, the diffusive reflector layer 32 may comprise at least one of MgO, $TiO_2$, and $BaSO_4$, for example. Each scintillator crystal may comprise one of LYSO, LSO, BGO, NaI(Tl), LaBr, GSO, LGSO and GAGG as will be appreciated by those skilled in the art.

The roughened end 30b of each scintillator crystal 30 may be based upon lapping with a 600 mesh grit abrasive, although other approaches are also contemplated. For example, the roughened end 30b may be formed by other abrasive or surface treatments, and may be formed by initially cutting of the crystal with a saw.

In some embodiments, scintillation crystal 30 may have respective x and y dimensions in a range of 0.4 to 6.3 mm. And each scintillation crystal may have a z dimension in a range of 5 to 30 mm. Further, each of the roughened end 30b and the polished end 30a may have a square shape. Of course, in other embodiments the ends 30a, 30b may be rectangular with different x and y dimensions. For example, some crystals may have a rectangular shape of 6.28×4.18 mm, and a length of 25 mm. In addition, smaller crystals may have a 0.5 mm pitch and an actual width of 0.43 mm.

The PET/CT scanner 20 includes at least one photodetector adjacent the polished ends 30a of the array of scintillator crystals 30. More particularly as shown in FIG. 2 four photomultiplier tubes 36 and an intervening light guide 37 is provided to detect light from the array block 35. In another embodiment described with additional reference to FIG. 3, the photodetectors may be provided by a plurality of solid state photodetectors, such as SiPM's as will be appreciated by those skilled in the art.

A method aspect is for making a radiation detector. The method may include forming a plurality of scintillator crystals 30 so that each scintillator crystal has a polished end 30a, a roughened end 30b opposite the polished end, and a plurality of polished sides 30c extending between the polished end and the roughened end. The method may further include arranging the plurality of scintillator crystals into an array with a specular reflector layer 31 between adjacent polished sides of adjacent ones of the array of scintillator crystals 30, and providing a diffusive reflector layer 32 adjacent the roughened ends of the array of scintillator crystals.

The conventional approach has been to use the highest reflecting material for the thin film between the crystals and also to use the same material to cover the outside face of an array block. This will leave one end face open to let the scintillating light out to reach the photodetectors.

As disclosed herein a combination of different reflecting materials and different crystal surfaces are used to increase the fraction of the scintillating light that can be reflected out from the open end of a long thin crystal. Both specular and diffusive reflector materials work together with the matching crystal surface finishing to guide the light out. The actual efficiency will also depend upon the physical size and the length to width aspect ratio of the scintillating crystal. A specular reflector material, such as ESR is used for the highly polished sides 30c of the long crystals 30 and a diffused reflector material, such as Teflon tape (PTFE) or $BaSO_4$ paste at one end face 30b opposite the light exiting face 30a. This diffusivity is further enhanced with the fine ground diffusive end 30b. The diffused surface at the roughened end 30b will disperse the scintillating light into many directions to achieve low incident angle to the sides 30c so that light can be reflected out with a reduced or minimum number of reflections and thus a reduced or minimum reflection loss. It is theorized without Applicant wishing to be bound thereto that reducing the total number of internal reflections inside the crystal 30 is an important aspect, because no reflection is 100% without loss. Even with a few percent loss per reflection, a large number of reflections may quickly absorb most of the light by the sides 30c leave little to go out at the polished end 30a. This may be particularly true for thin and long crystals with a high length to width aspect ratio.

Unfortunately, with the push to higher image resolution and the adaptation of all solid state photodetectors, the general trend is to reduce the width of the crystals pixels without a reduction of the crystal length since the crystal length is needed to have sufficient stopping power to capture the incoming gamma-rays. The embodiments disclosed herein work particular well for the arrays made with thin long crystals 30 of high length to width ratios.

In the past, almost all the efforts have been focused on the search for the best reflecting materials. Specular type reflectors, such as metallic foil and thin metallic coatings, have been tried with very poor result. Diffusive type reflectors, such as white paint or paste materials have shown much better results. White pigments such as MgO, $TiO_2$ and $BaSO_4$ have been used. At the present time, $BaSO_4$ paint or paste seems to give the better results. However, to apply a thin and uniform thickness layer of $BaSO_4$ paint or paste under 0.1 mm thick between the crystals in an array block is a very slow and difficult process. So for practical purposes, the paint thickness has been limited to about 0.2 mm or thicker. This may be satisfactory, if the crystal width is relatively large (>3 mm). But it will become a more important issue for arrays with crystals of smaller width (<2 mm) since the volume fraction of the reflector material will become significant.

For thinner diffusive reflector material, Teflon tape has been the most commonly used material with good results. By far, Teflon tape seems to be the best and most versatile reflector material for all types of scintillation applications whether it is a single piece of crystal or an array block. Unfortunately, it also has its limitation. First, installing a Teflon tape reflector is always a very labor intensive process since it is only done by hand. Second, even though the Teflon tape thickness can be as thin as 0.07 mm, it seems still to work well only with large (>3 mm) size crystals. The performance will become worse with thinner crystals and it will also become unpractical to wrap crystals with a width less than 2 mm. The reason for the degraded performance is also due to excessive reflection and absorption of diffused light at each reflection.

Teflon wrapped crystals may work well if the crystal pixel length to width ratio is less than 6. For example, a 4×4 mm crystal should not have a length greater than 24 mm, preferably down to 20 mm. This is because the total number of the internal reflections will be less. For thinner crystals of similar length, such as 2×2×20 mm size with an aspect ratio of 10, the light output will become much worse due to excessive internal reflections.

The new ESR film is a totally different class of reflecting material. It is a sheet made with multiple thin layers of plastic film with the thickness that will satisfy the equation of total reflection, $d=m\lambda/2n$, in the visible region of the light spectrum. The ESR film is also very thin with an average thickness of 0.065 mm. Indeed, array blocks have been made with ESR film reflector with relatively good results. The advantage of the ESR film is the low reflection loss at each reflection. However, the ESR film does suffer with the problem of being too specular and not diffusive enough. It has good performance in many other applications, but for scintillator array blocks, it is not perfect. The ESR film seems to work reasonably well with smaller dimension pixels (<2 mm) and not so well with larger dimension pixels (>3 mm) as compared with the diffusive type of reflectors. This is based on array blocks made with crystals with all surfaces polished. The result seems to be the reverse with respect to that of $BaSO_4$ paste and Teflon tape.

The embodiments disclosed herein are directed to an array block 35 with hybrid reflectors that will take advantage of the merits of each type of reflector material to match with proper crystal surfaces in order to increase or maximize the light output. The embodiments may also be suitable for many size array blocks with both large and small widths of the crystals.

The hybrid reflector array block 35 is based on the following design features. The specular ESR reflector layer 31 is used for the four sides 30c of the crystals 30. The crystal 30 will have the four sides being polished. It is desirable to have a reduced or minimum loss on each of the reflections by the four sides 30c. On the other hand, it may not be desirable to have the light inside the crystal 30 with only specular reflection. The high angle specular reflection will trap the light inside the crystal 30 by the four sides 30c and never be able to get out at the polished ends 30a. It may be desirable to have the light generated by the scintillation process break into diffusive reflections with many directions. Accordingly, it may be desirable to have the diffusive reflecting surface, and the fine-ground or roughened end 30b in combination with a diffusive reflector 32 to help get the light out of the open polished end 30a of a long crystal 30.

Since the ESR film or specular reflector layer 31 is very thin (0.065 mm), this reduces the volume fraction of the reflecting material and yields a relatively high packing density of scintillator crystals 30 to improve the chance of gamma ray capture. This is particularly true for crystals of small width dimension.

The thickness of the reflecting film is important since the fraction of the scintillating material volume is reduced if the reflecting film becomes too thick. For example, for a 4×4 mm cross section crystal with 0.1 mm thick reflector, the volume fraction of the reflector film will be 4.8%. When the crystal cross section is reduced down to 1×1 mm, then with the same 0.1 mm thick reflector film, the reflector volume fraction will increase to 17.4%. If the reflector film thickness goes higher than 0.1 mm, then its volume fraction will be even higher. For 4×4 mm crystals with 0.2 mm thick reflector, the volume fraction of the reflector will be increased to 9.3%. This kind of high volume fraction may not be acceptable for modern high-end PET scanners, for example.

A PET detector ring typically contains a large number of array blocks 35 with many crystals 30. It is desirable to simplify the assembly process for mass production. With a solid ESR film, one is able to pack the crystals 30 and specular layer 31 together easily with high precision. This is particularly true with smaller dimensions of the crystals 30. With the modern array block 35' using all solid state photodetectors 40' (FIG. 3) the high precision pitch of the array block may be important for the design, and the embodiments described herein are especially helpful in achieving this goal.

FIGS. 4-6 illustrate a configuration of the large 14×14 array block 35. It typically matches with PMTs 36 as the photodetectors as shown in FIG. 2. For modern PET scanners, for example, the most common scintillator crystals used are BGO, LSO and LYSO. The embodiments disclosed herein will work well for all these crystals and also other possibilities as will be appreciated by those skilled in the art.

FIGS. 7-10 illustrate a configuration of a small 16×16 array block 35'. Small size array blocks 35' are generally matched with the SiPM type, solid-state photodetectors 40'(FIG. 3).

EXAMPLE 1

Figure 11:
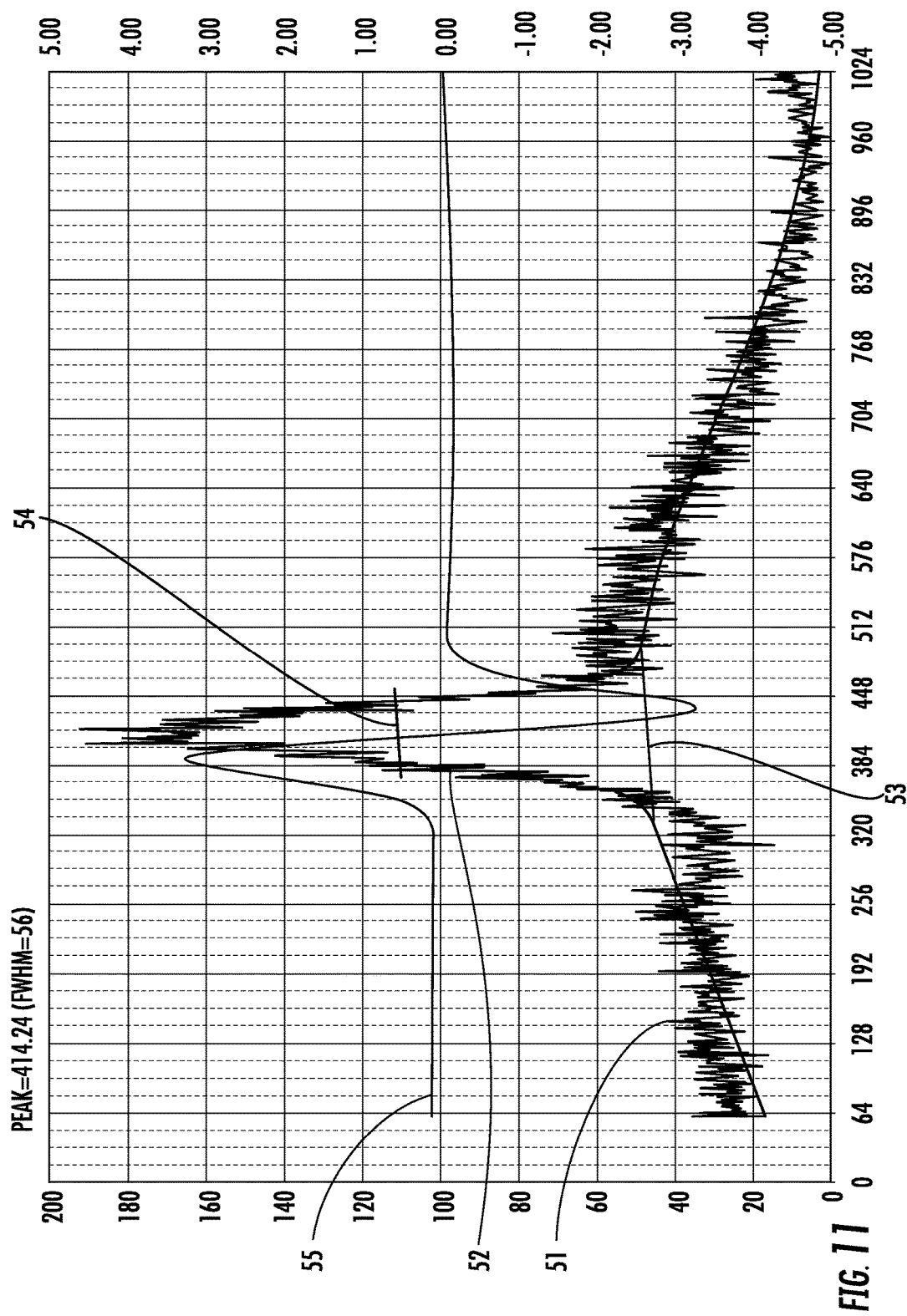
FIG. 11 is a graph of light output data of Example 1.

A 14×14 array block was built with 3.86×3.86×19 mm size LYSO crystals with all surfaces polished. The LYSO crystal has an aspect ratio of 19/3.86=5.0. An ESR film was used as the specular reflector layer between the crystals and also all around the five outer surfaces of the array block except the bottom face where scintillating light exits. The block was facing down with the open face placed on top of a Hamamatsu R877 PMT in an enclosed box without any external light leaking into it. A Na-22 radiation source was placed at a small distance above the array block. This was used to generate the 511 KeV gamma ray radiation based on the positron-electron annihilation process. Scintillating light was produced by the LYSO crystals after capturing the 511 KeV gamma rays. The intensity of the scintillating radiation was recorded by a Canberra Genie 2000 Spectrometer. The Spectrometer was pre-calibrated with a BGO crystal standard which sets the intensity at 100, so all the measured scintillating light intensities can be compared directly. With this block built with all ESR reflector layers, we recorded a light intensity of 414. The light output data is shown in FIG. 11, in which plot 51 is the data of the actual counts in each channel, plot 52 is the smoothed curve based upon the actual counts, plot 53 is the line segment showing the base line of the light peak, plot 54 is the line segment showing the FWHM of the light peak, and plot 55 is the slope of the light peak spectra.

EXAMPLE 2

Figure 12:
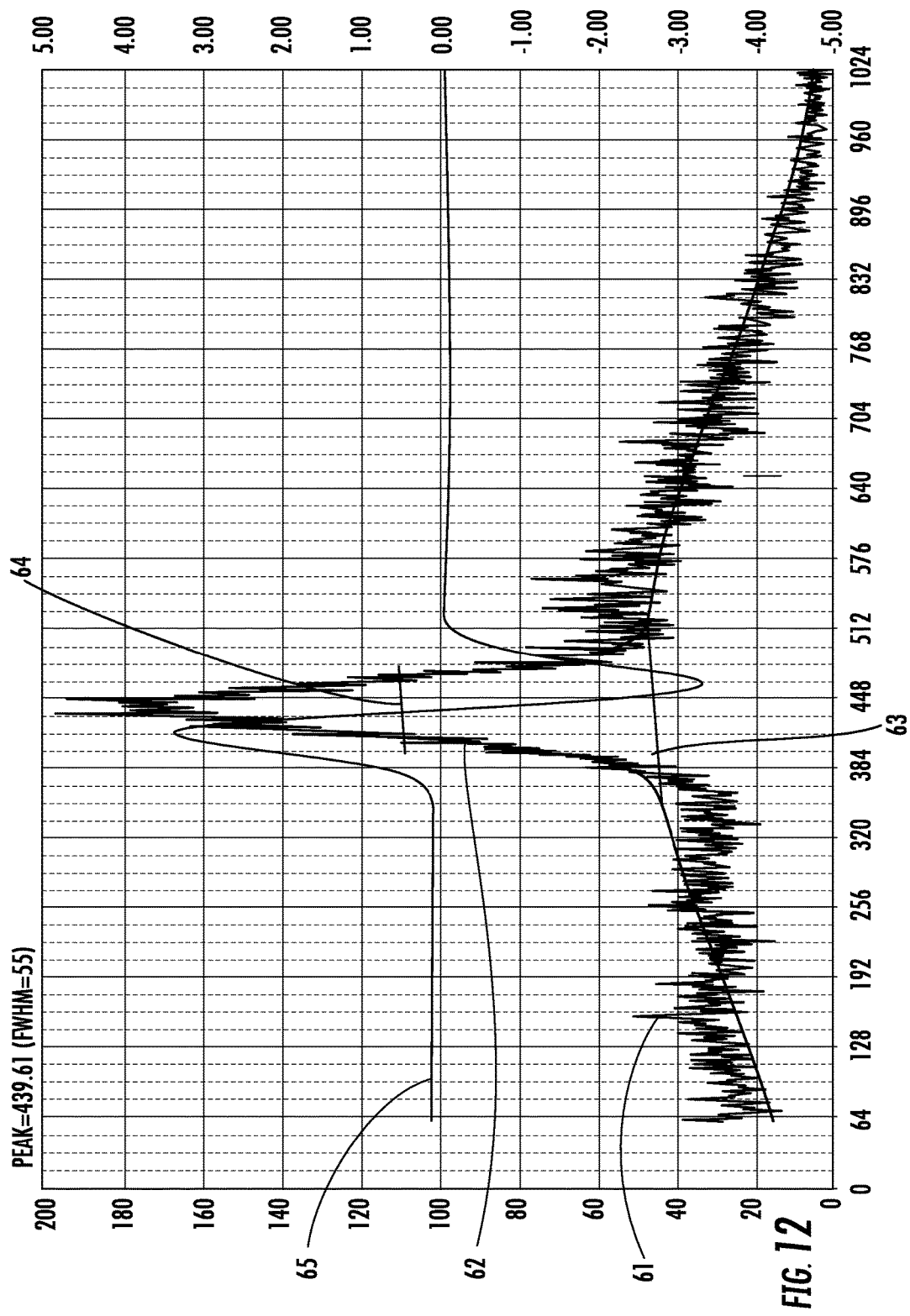
FIG. 12 is a graph of light output data of Example 2.

The exact same set up as described in Example 1 was used to measure the scintillating light intensity in all the subsequent examples. Again, the spectrometer was pre-calibrated so that the recorded scintillating light intensity can be compared directly among all the examples. Here the same 14×14 array block as in Example 1 was used with top ESR reflector layer removed and replaced with a Teflon tape reflector layer. We measured a light intensity of 440, a slight improvement of light output. The light output data is shown in FIG. 12, in which plot 61 is the data of the actual counts in each channel, plot 62 is the smoothed curve based upon the actual counts, plot 63 is the line segment showing the base line of the light peak, plot 64 is the line segment showing the FWHM of the light peak, and plot 65 is the slope of the light peak spectra. This example demonstrates the improvement of light exit with a diffusive end layer as compared to a specular reflecting layer.

EXAMPLE 3

Using the same block described in Example 2, we removed the top Teflon tape reflector layer. We then roughened the top end of the array block with a 600 mesh abrasive. The block was thoroughly cleaned and dried afterward. We then attached to the top fine-ground surface an ESR reflector cover. With the same set up, we measured a light intensity of 534. This is a significant improvement for the light output. Clearly, even with a ESR specular end face reflector layer, the fine ground end faces of the crystals were able to break the light into diffusive reflections and thus facilitate the exit at the open end of the array block.

EXAMPLE 4

Figure 13:
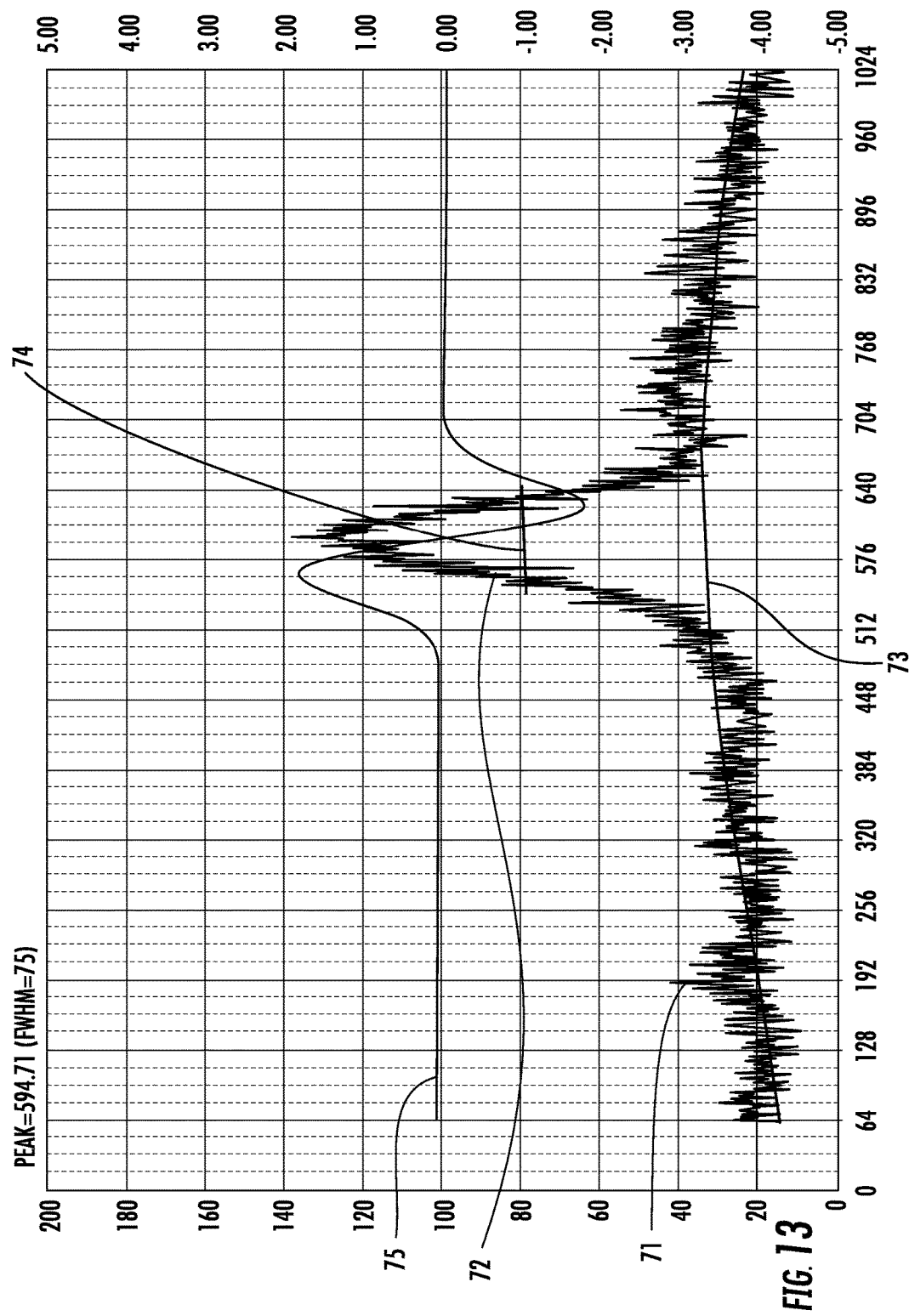
FIG. 13 is a graph of light output data of Example 4.

We took the same block as in Example 3 and removed the ESR reflector layer on the top. We then replaced it with a Teflon tape reflector layer. With the same set up, we measured a light intensity of 595. The light output data is shown in FIG. 13, in which plot 71 is the data of the actual counts in each channel, plot 72 is the smoothed curve based upon the actual counts, plot 73 is the line segment showing the base line of the light peak, plot 74 is the line segment showing the FWHM of the light peak, and plot 75 is the slope of the light peak spectra. This is the best result among the four similar examples. Comparing with Example 1, we observed that the light output intensity has increased by 44%. The combination of the diffusive Teflon tape and the fine ground (roughened) diffusive end of the crystal as well as the specular ESR reflector film with fully polished sides gave the most efficient way to guide the scintillating light out of the crystals.

These four prior examples demonstrated that the hybrid array block works well with array blocks made of relatively large size crystals. On the other hand, for array blocks with large crystals and a small length to width aspect ratio, one can find that a pure diffusive reflector design can also achieve very good light exiting at the end of the array block.

EXAMPLE 5

A different 14×14 array block was built with 3.61×3.61× 19 mm size LYSO crystals with five surfaces polished and one end 3.61 mm×3.61 mm face fine lapped with 600 mesh abrasive. The LYSO pixel has an aspect ratio of 19/3.61=5.26. Teflon tape was used as reflector between the crystals and also all around the five outer surfaces of the array block except the bottom end where scintillating light exits. With the same set up, a light intensity of 570 was measured. The result is close to the Example 4 hybrid embodiment.

Again the diffusive reflection facilitates the light exit at the end of the array block. The small aspect ratio of the crystal pixels may be important to achieve this high performance. So even with total diffusive reflections, the short aspect ratio of the crystals may minimize the total number of internal reflections and maximize the light exit.

However, Teflon tape may only be suitable for large array blocks with large and wide crystals. This is because of the extensive labor work needed to wrap the crystals with the Teflon tape. Moreover, the volume fraction of the Teflon tape is also high as compared with ESR film. So for the small size array blocks with smaller size and width crystals, its performance drops quickly and the difficulty in making the array block increases rapidly.

EXAMPLE 6

Figure 14:
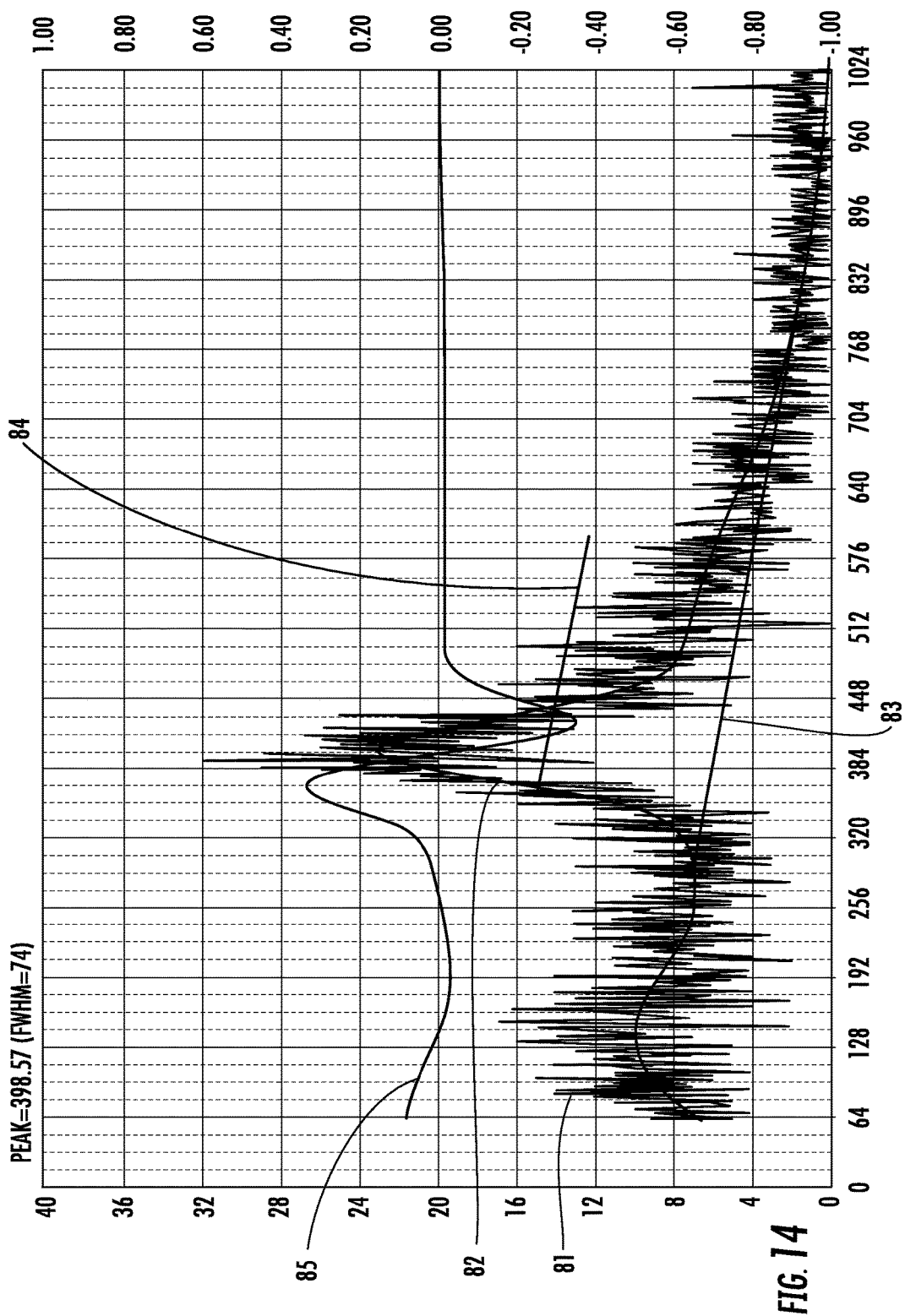
FIG. 14 is a graph of light output data of Example 6.

A small 16×16 array block was built with 1.52×1.52×12 mm size LYSO crystals with all surfaces polished. The LYSO crystal has an aspect ratio of 12/1.52=7.9. The ESR film was used as reflector between the crystals and also all around the five outer sides of the array block except the bottom end where the scintillating light exits. With the same set up of the scintillating detection system, a light intensity of 399 was measured. The light output data is shown in FIG. 14, in which plot 81 is the data of the actual counts in each channel, plot 82 is the smoothed curve based upon the actual counts, plot 83 is the line segment showing the base line of the light peak, plot 84 is the line segment showing the FWHM of the light peak, and plot 85 is the slope of the light peak spectra.

EXAMPLE 7

Figure 15:
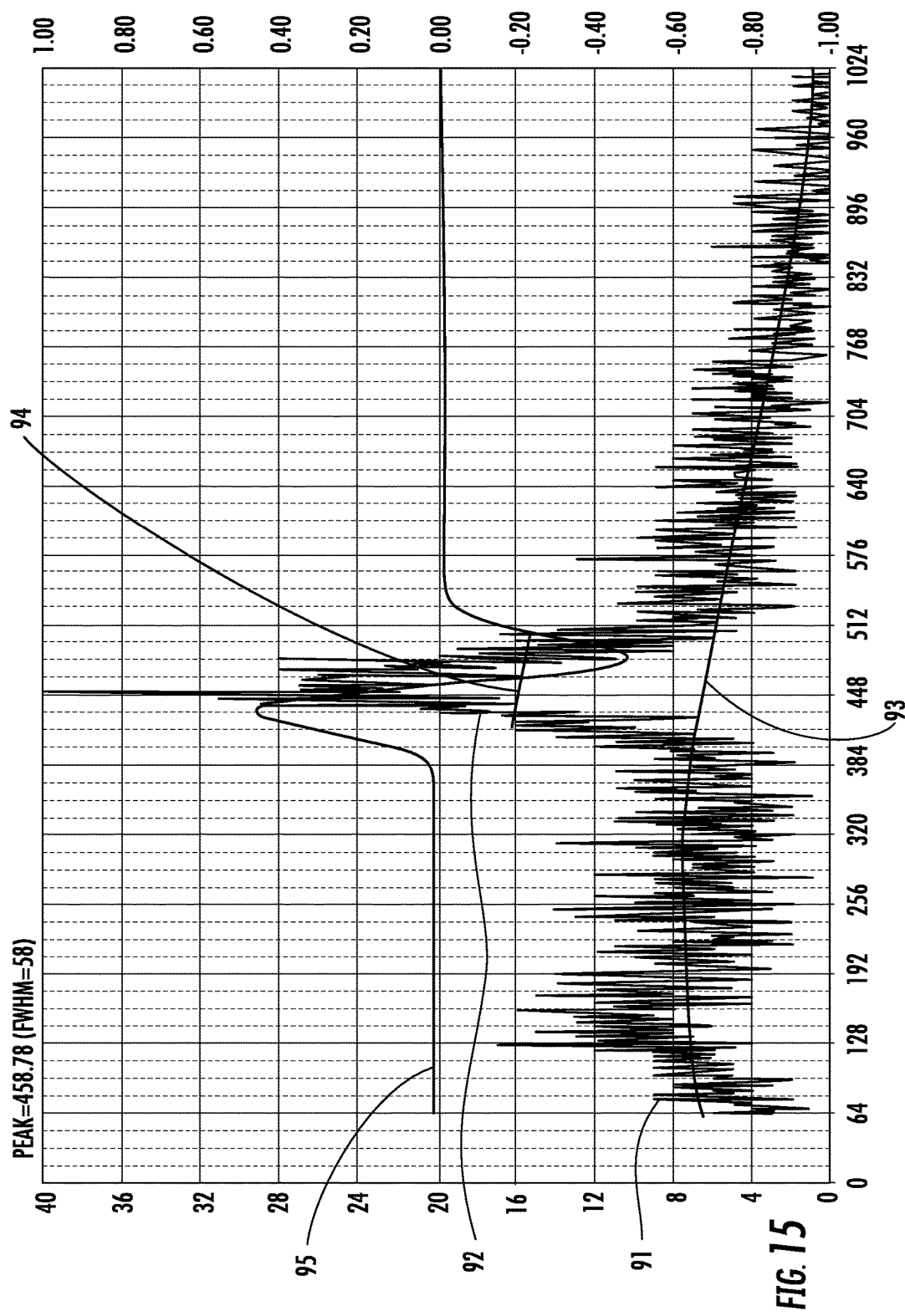
FIG. 15 is a graph of light output data of Example 7.

Here the same 16×16 array block as in Example 6 is used with the top ESR reflector cover replaced with a Teflon tape diffusive reflector layer. So with the same measurement set up, a light intensity of 459 was measured. The light output data is shown in FIG. 15, in which plot 91 is the data of the actual counts in each channel, plot 92 is the smoothed curve based upon the actual counts, plot 93 is the line segment showing the base line of the light peak, plot 94 is the line segment showing the FWHM of the light peak, and plot 95 is the slope of the light peak spectra.

This example again demonstrates the improvement of light exit with a diffusive end compared to the specular end in a small size array block. Comparing this example with the relative results of Examples 1 and 2 with a light improvement from 414 to 440, we can draw the following conclusion: with the polished end of the crystals, the diffusive reflector layer works better for smaller width crystal blocks than the larger width crystal blocks.

Figure 16:
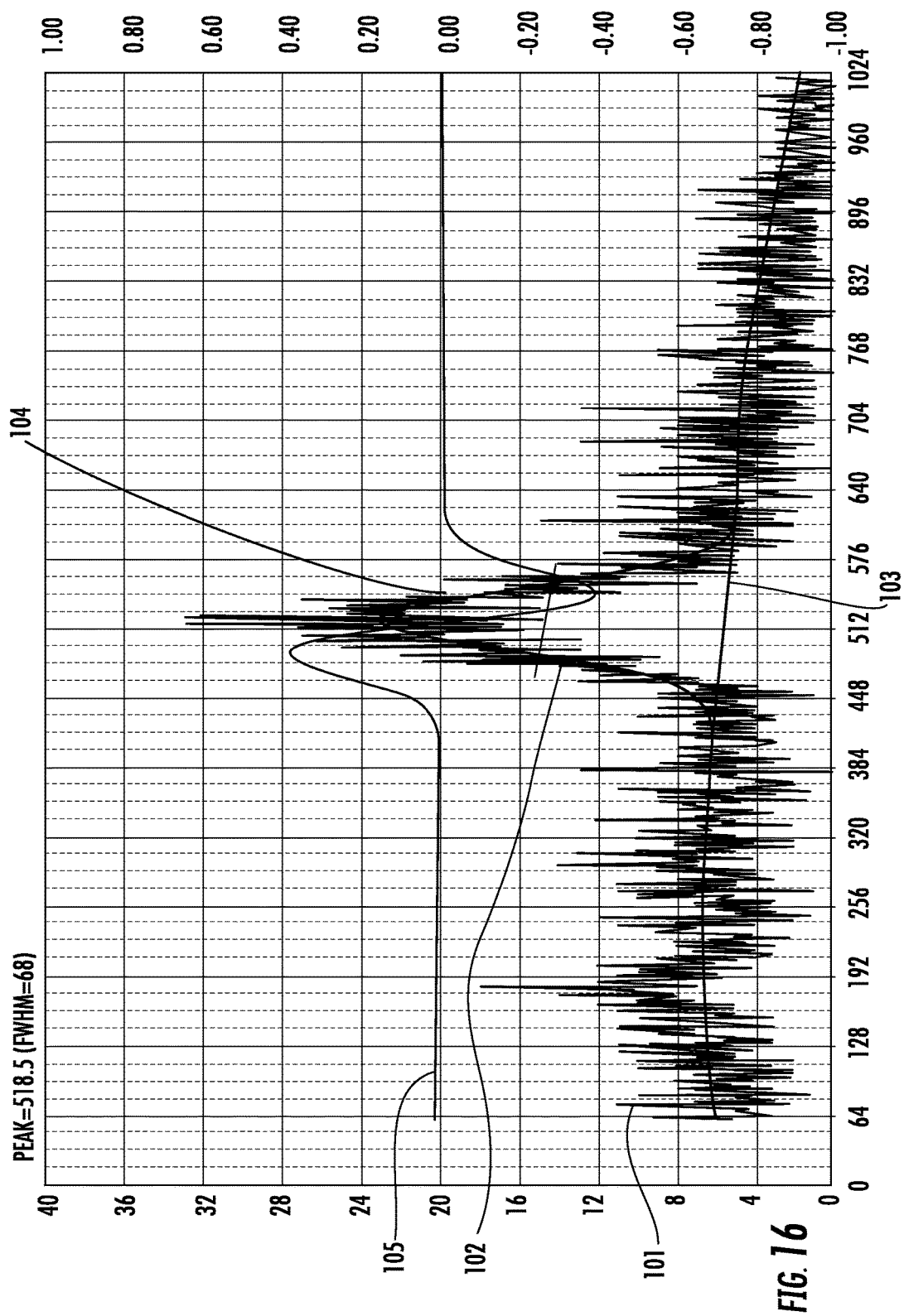
FIG. 16 is a graph of light output data of Example 8.

Example 8: This example is a small 16×16 array block from the same batch of 1.52×1.52×12 mm size LYSO crystals with five surfaces polished and one end face fine ground with 600 mesh abrasive (i.e. roughened). The LYSO crystals also have an aspect ratio of 12/1.52=7.9. The ESR film was used as the specular reflector between the crystals and also all around the five outer sides of the array block except the bottom end where scintillating light exits. With the same set up of the scintillating detection system, a light intensity of 518 was measured. The light output data is shown in FIG. 16, in which plot 101 is the data of the actual counts in each channel, plot 102 is the smoothed curve based upon the actual counts, plot 103 is the line segment showing the base line of the light peak, plot 104 is the line segment showing the FWHM of the light peak, and plot 105 is the slope of the light peak spectra. Comparing this with the result of Example 6, the improvement is significant from 399 to 518, a 30% increase.

EXAMPLE 9

Figure 17:
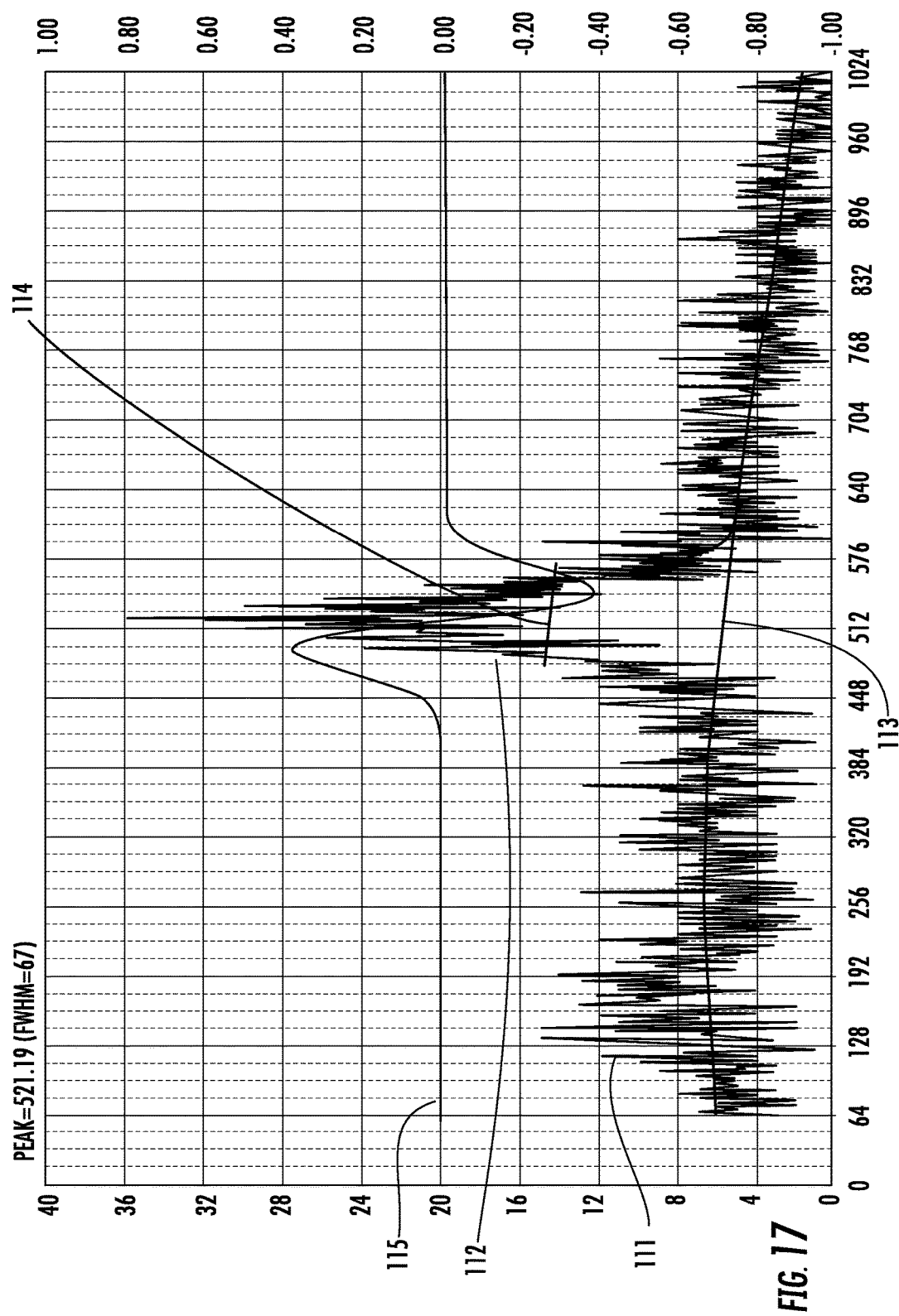
FIG. 17 is a graph of light output data of Example 9.

This is the same 16×16 array block in Example 8 with the top ESR reflector layer replaced with a Teflon tape reflector layer. So with the same measurement set up, a light intensity of 521 was measured. The light output data is shown in FIG. 17, in which plot 111 is the data of the actual counts in each channel, plot 112 is the smoothed curve based upon the actual counts, plot 113 is the line segment showing the base line of the light peak, plot 114 is the line segment showing the FWHM of the light peak, and plot 115 is the slope of the light peak spectra. Again, this is the best result among the four examples of small crystal array blocks. Comparing this to the result of Example 6, the improvement is also significant from 399 to 521, a 30.6% increase.

The Examples are summarized in Table 1 below.

TABLE 1

| Ex. | Size (mm) (LYSO crystal) | Input End | Side Film | Input End Film | Light Intensity |
|---|---|---|---|---|---|
| 1 | 3.86 × 3.86 × 19 (14 × 14 array) | polished | ESR | ESR | 414 |
| 2 | 3.86 × 3.86 × 19 (14 × 14 array) | polished | ESR | Teflon | 440 |
| 3 | 3.86 × 3.86 × 19 (14 × 14 array) | roughened | ESR | ESR | 534 |
| 4 | 3.86 × 3.86 × 19 (14 × 14 array) | roughened | ESR | Teflon | 595 |
| 5 | 3.61 × 3.61 × 19 (14 × 14 array) | roughened | Teflon | Teflon | 570 |

TABLE 1-continued

| Ex. | Size (mm) (LYSO crystal) | Input End | Side Film | Input End Film | Light Intensity |
|---|---|---|---|---|---|
| 6 | 1.52 × 1.52 × 12 polished (16 × 16 array) | | ESR | ESR | 399 |
| 7 | 1.52 × 1.52 × 12 polished (16 × 16 array) | | ESR | Teflon | 459 |
| 8 | 1.52 × 1.52 × 12 roughened (16 × 16 array) | | ESR | ESR | 518 |
| 9 | 1.52 × 1.52 × 12 roughened (16 × 16 array) | | ESR | Teflon | 521 |

Based on a comparison of Examples 8 and 9, one can see that for small size arrays with small width crystals with a large length to width aspect ratio, grinding the end face with the 600 mesh abrasives will give more light output improvement (30 and 30.6%, respectively). But the replacement of the ESR reflector layer with Teflon tape showed a small improvement (0.6% only).

Applicants theorize without wishing to be bound thereto that the diffusivity created by the roughening the end with 600 mesh abrasive may be sufficient to reach near the maximum of light exit. For larger width crystal array blocks as shown in Examples 3 and 4, just roughening the end face with 600 mesh abrasive with the ESR reflector layer may not be sufficient to reach the maximum of the desired light diffusivity—replacing the ESR layer with Teflon tape reflector gave another 11.5% improvement.

Comparing the light output of Examples 3 and 4 of 534 and 595, respectively, and that of Examples 8 and 9 of 518 and 521, respectively, one can see the effect of crystal pixels width (3.86 mm vs. 1.52 mm) and also the aspect ratio (5.0 vs. 7.9) on the light output of the array blocks. All these blocks are made with LYSO crystals that have an average of light output around 650.

These examples show that the hybrid embodiments of Examples 4 and 9 can significantly improve the light output from the open end as compared with the conventionally made detector arrays. The embodiments will work for both arrays made with large width crystals and arrays made with small width crystals. There may be a desire for further optimization depending on the width as well as the aspect ratio of the crystals. The examples demonstrated that it is possible to get 79% and 90% of the scintillating light exiting out of the open end of a small and a large size array block, respectively.

All these examples demonstrate that specular reflector with a high reflectivity is really not ideal to guide the light out at the end of a long crystal. The reason is because there may be too many high angle internal reflections. These multiple reflections will cause most of the light to be absorbed by the walls without any chance to get out. The diffusive reflector at the end will break the light into many directions. The low incident angle of the light will be reflected by the specular side surfaces of the crystals. It is much easier for the light to get out of the crystal end with a minimum number of reflections and thus a minimum loss. This may be more true when the pixel length to width aspect ratio becomes higher. With modern all solid state SiPM detectors with thinner and thinner crystals, efficient light exit from the end of the crystal has become an important issue to determine the performance of a scanner. The hybrid embodiments disclosed herein offer efficient approaches to increase the light exit from the end face of an array block.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An apparatus comprising:
   an array of scintillator crystals, each scintillator crystal having a polished end, a roughened end opposite the polished end, and a plurality of polished sides extending between the polished end and the roughened end;
   a specular reflector layer between adjacent polished sides of adjacent ones of said array of scintillator crystals; and
   a diffusive reflector layer adjacent the roughened ends of said array of scintillator crystals.

2. The apparatus according to claim 1 wherein said specular reflector layer comprises a plurality of stacked plastic layers.

3. The apparatus according to claim 1 wherein said diffusive reflector layer comprises polytetrafluoroethelene (PTFE).

4. The apparatus according to claim 1 wherein said diffusive reflector layer comprises at least one of MgO, $TiO_2$, and $BaSO_4$.

5. The apparatus according to claim 1 wherein each scintillator crystal comprises one of LYSO, LSO, BGO, NaI(Tl), $LaBr_3$, GSO, LGSO and GAGG.

6. The apparatus according to claim 1 wherein said roughened end is based upon lapping with a 600 mesh grit abrasive.

7. The apparatus according to claim 1 wherein each scintillator crystal has respective x and y dimensions in a range of 0.4 to 6.3 mm.

8. The apparatus according to claim 1 wherein each scintillator crystal has a z dimension in a range of 5 to 30 mm.

9. The apparatus according to claim 1 wherein each of said roughened end and said polished end has a square shape.

10. The apparatus according to claim 1 further comprising at least one photodetector adjacent the polished ends of said array of scintillator crystals.

11. The apparatus according to claim 10 further comprising a processor and a memory associated therewith coupled to said at least one photodetector.

12. The apparatus according to claim 10 further comprising:
    at least one other imaging scanner; and
    a processor and an associated memory coupled to said at least one other imaging scanner and said array of scintillator crystals.

13. The apparatus according to claim 10 wherein said at least one photodetector comprises a plurality of photomultiplier tubes.

14. The apparatus according to claim 10 wherein said at least one photodetector comprises a plurality of solid state photodetectors.

15. An apparatus comprising:
    an array of scintillator crystals, each scintillator crystal having a polished end, a roughened end opposite the polished end, and a plurality of polished sides extending between the polished end and the roughened end, said roughened end being based upon lapping with a 600 mesh grit abrasive;

a specular reflector layer between adjacent polished sides of adjacent ones of said array of scintillator crystals;

a diffusive reflector layer adjacent the roughened ends of said array of scintillator crystals;

at least one photodetector adjacent the polished ends of said array of scintillator crystals; and a processor and a memory associated therewith and coupled to said at least one photodetector.

16. The apparatus according to claim 15 wherein said specular reflector layer comprises a plurality of stacked plastic layers.

17. The apparatus according to claim 15 wherein said diffusive reflector layer comprises polytetrafluoroethelene (PTFE).

18. The apparatus according to claim 15 wherein said diffusive reflector layer comprises at least one of MgO, $TiO_2$, and $BaSO_4$.

19. The apparatus according to claim 15 wherein each scintillator crystal comprises one of LYSO, LSO, BGO, NaI(Tl), $LaBr_3$, GSO, LGSO and GAGG.

20. The apparatus according to claim 15 wherein each scintillator crystal has respective x and y dimensions in a range of 1 to 4 mm, and a z dimension in a range of 5 to 30 mm.

21. A method for making a radiation detector comprising:
forming a plurality of scintillator crystals so that each scintillator crystal has a polished end, a roughened end opposite the polished end, and a plurality of polished sides extending between the polished end and the roughened end;

arranging the plurality of scintillator crystals into an array with a specular reflector layer between adjacent polished sides of adjacent ones of the array of scintillator crystals; and providing a diffusive reflector layer adjacent the roughened ends of the array of scintillator crystals.

22. The method according to claim 21 wherein the specular reflector layer comprises a plurality of stacked plastic layers.

23. The method according to claim 21 wherein the diffusive reflector layer comprises polytetrafluoroethelene (PTFE).

24. The method according to claim 21 wherein the diffusive reflector layer comprises at least one of MgO, $TiO_2$, and $BaSO_4$.

25. The method according to claim 21 wherein each scintillator crystal comprises one of LYSO, LSO, BGO, NaI(Tl), $LaBr_3$, GSO, LGSO and GAGG.

26. The method according to claim 21 wherein the roughened end is based upon lapping with a 600 mesh grit abrasive.

27. The method according to claim 21 wherein each scintillator crystal has respective x and y dimensions in a range of 1 to 4 mm, and a z dimension in a range of 5 to 30 mm.

28. The method according to claim 21 further comprising positioning at least one photodetector adjacent the polished ends of the array of scintillator crystals.

* * * * *